United States Patent [19]
Woolley

[11] Patent Number: 5,826,921
[45] Date of Patent: Oct. 27, 1998

[54] THREADED PIPE JOINT

[76] Inventor: Brown J. Woolley, P.O. Box 1249, Kilgore, Tex. 75662

[21] Appl. No.: 777,194

[22] Filed: Dec. 27, 1996

Related U.S. Application Data

[63] Continuation of Ser. No. 545,422, Oct. 19, 1995, abandoned, which is a continuation of Ser. No. 331,141, Aug. 15, 1994, abandoned, which is a continuation of Ser. No. 120,841, Sep. 10, 1993, abandoned, which is a continuation of Ser. No. 796,811, Nov. 25, 1991, abandoned.

[51] Int. Cl.$^6$ .................................................. F16L 15/00
[52] U.S. Cl. .......................... 285/334; 285/382; 285/390
[58] Field of Search .................................. 285/334, 333, 285/355, 390, 382; 411/411, 369, 414, 909

[56] References Cited

U.S. PATENT DOCUMENTS

| | | | |
|---|---|---|---|
| 1,993,257 | 3/1935 | Bettis | 403/343 X |
| 2,054,118 | 9/1936 | Childs et al. | 285/333 X |
| 2,112,108 | 3/1938 | Mackenzie | 403/343 X |
| 2,196,966 | 4/1940 | Hammer | 285/46 |
| 2,380,690 | 7/1945 | Graham | 285/333 X |
| 2,494,128 | 1/1950 | Holmquist et al. | 285/367 X |
| 3,054,628 | 9/1962 | Hardy et al. | 285/333 X |
| 3,067,593 | 12/1962 | McCool | 285/333 X |
| 3,083,767 | 4/1963 | Brown | 285/333 X |
| 3,100,656 | 8/1963 | MacArthur | 285/333 X |
| 3,508,771 | 4/1970 | Duret | 285/334 |
| 4,373,754 | 2/1983 | Bollfrass et al. | 285/334 |
| 4,494,777 | 1/1985 | Duret | 285/334 X |
| 4,537,428 | 8/1985 | Landriault | 285/333 |
| 4,595,219 | 6/1986 | Lenze et al. | 285/333 |
| 4,600,225 | 7/1986 | Blose | 285/334 |
| 4,629,224 | 12/1986 | Landriault | 285/334 |
| 4,696,498 | 9/1987 | Church | 285/334 |
| 4,707,001 | 11/1987 | Johnson | 285/332.3 |
| 4,753,460 | 6/1988 | Tung | 285/355 X |
| 4,813,717 | 3/1989 | Watts | 285/333 |
| 4,865,364 | 9/1989 | Nobileau | 403/343 X |
| 4,946,201 | 8/1990 | Tai | 285/94 |
| 5,066,052 | 11/1991 | Read | 285/334 |
| 5,092,635 | 3/1992 | DeLange et al. | 255/355 X |
| 5,154,452 | 10/1992 | Johnson | 285/333 |

FOREIGN PATENT DOCUMENTS

| | | | |
|---|---|---|---|
| 0318537 | 12/1969 | Sweden | 285/333 |
| 2099529 | 12/1982 | United Kingdom | 285/334 |
| 2152168 | 7/1985 | United Kingdom | 285/333 |

Primary Examiner—Terry Lee Melius
Assistant Examiner—Heather Shackelford
Attorney, Agent, or Firm—Vinson & Elkins, L.L.P.

[57] ABSTRACT

A threaded flush joint for tubular members, particularly a well casing string joint which includes a pin member and a box member, the pin member having an external torque shoulder and being swaged inwardly on its end from the torque shoulder to its end and having external hook threads on its swaged portion, the box member having internal shoulder and internal hook threads which mate with the external hook threads of said pin member. The load flank of the threads of the joint is provided on a flank having a reverse angle taper of approximately 7°.

1 Claim, 1 Drawing Sheet

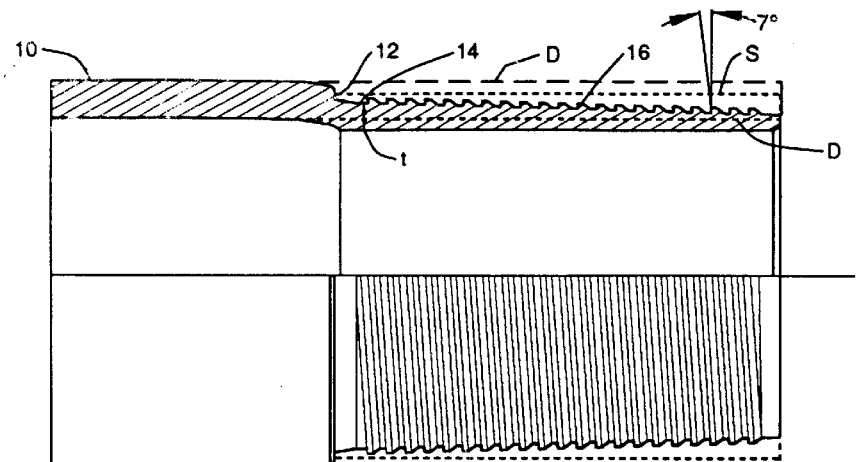
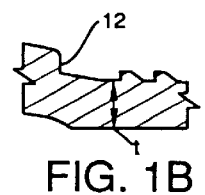
FIG. 1
FIG. 1A
FIG. 1B
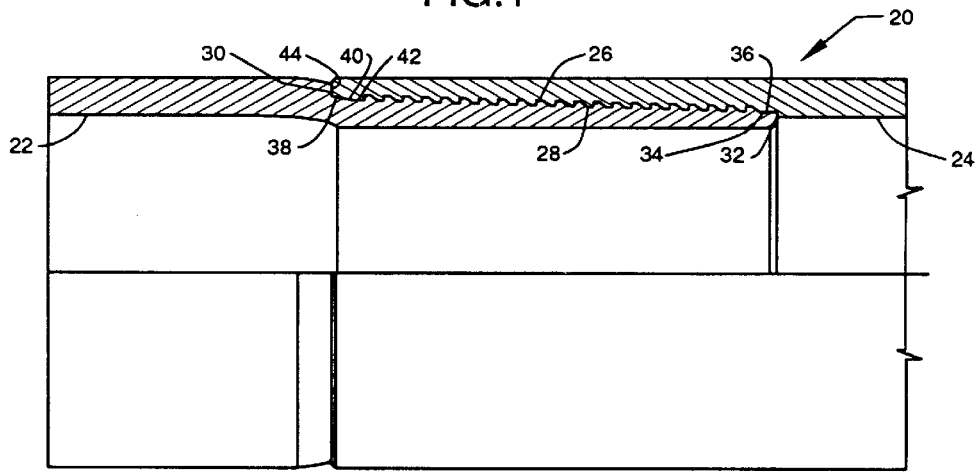
FIG. 2
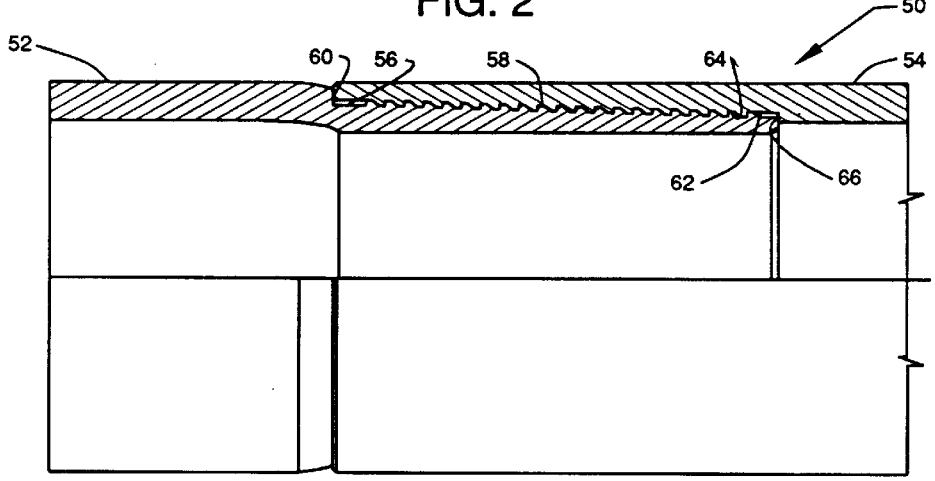
FIG. 3

THREADED PIPE JOINT

The present application is a continuation of Ser. No. 08/545,422, filed Oct. 19, 1995, now abandoned, which is a continuation of Ser. No. 08/331,141, filed Aug. 15, 1994, now abandoned, which is a continuation of Ser. No. 08/120,841, filed Sep. 10, 1993, now abandoned, which is a continuation of application Ser. No. 07/796,811, filed Nov. 25, 1991, now abandoned.

BACKGROUND

The present invention relates to an improved threaded pipe joint which can be used as a threaded flush joint casing connection and in which the joint provides an improved strength and reliability over the threaded pipe joints of the prior art.

U.S. Pat. No. 4,707,001 discloses a threaded well liner connection in which the two joined ends are threaded with hook threads and a recess is provided at each end of the threads between the bell and pin members of the joint. A primary internal seal is provided by an interference fit of the pin end lip with the sealing surface on the bell at the inner end of the bell threads. A thermoplastic seal ring is provided between the interference fit of the pin end lip and the threads. The box lip and the pin shoulder have mating surfaces which are undercut to limit any outward movement of the box lip. A secondary seal is provided between the box lip and the surface of the pin between the end of the threads and the pin shoulder.

U.S. Pat. No. 2,196,966 discloses a threaded pipe joint which in one form is a flush joint and has threads with a gentle taper on the leading faces and the lips of the pin and box ends engage the shoulder on the other members.

U.S. Pat. No. 2,196,966 discloses a threaded pipe joint with both the pin and box ends having enlarged outer diameters in their threaded portions. The female member has a lip end which engages a shoulder on the male member. The threads are designed with varying groove widths to provide decreased resistance to the entry of the male member into the female member.

U.S. Pat. No. 4,600,225 discloses a tubular connection having threads which provide a chevron type interfit between the load bearing flanks. The threads are used on pin and box joints and with a coupling between two pin ends. Each threaded portion of the pin and box ends is enlarged or upset to have a larger outer diameter.

U.S. Pat. No. 4,629,224 discloses a tubular connection with two step threads having reverse angle torque shoulders or hook threads. Frusto-conical surfaces between the two sets of threads provide the metal-to-metal sealing surfaces.

U.S. Pat. No. 4,696,498 discloses a tubular connection with stepped reverse or hook threads and includes two internal pressure seals including a compressible metal-to-metal seal and a supplementary seal of a resilient corrosion resistant material.

U.S. Pat. No. 4,946,201 discloses an oil field tubular connection with hook threads and a frusto-conical sealing surface near one of the ends with anti-galling grooves provided along the exterior sealing surface.

SUMMARY

The improved threaded pipe joint of the present invention includes a box end having internal threads and a pin end having external threads to mate within the internal box threads. The pin end has been prepared from a standard section of pipe with the pin end being swaged inwardly over the length of the threads and then having the threads cut therein so that the pin is substantially stronger in the area which is normally the critical point of stress in pin shoulder area. The threads are hook threads and the box threads are made in the normal manner and mate with the pin end threads. In one form of the invention a recess is provided in the area of critical dimension of the pin and box ends or box shoulder area only.

An object of the present invention is to provide an improved threaded joint for tubular members which has increased strength, without increasing the outer diameter of the tubular members at their joint ends.

A further object of the present invention is to provide an improved threaded flush casing joint in which the critical dimension of the thickness of the members at the thread root in the location spaced farthest from the end of each member is greater than in the prior art devices.

Another object of the present invention is to provide an improved threaded flush joint suitable for joining well casing members which has improved pressure sealing and tensile strength in use.

A still further object of the present invention is to provide an improved threaded joint for a flush casing string which for a given diameter and wall thickness has improved tensile strength and sealing ability.

BRIEF DESCRIPTION OF THE DRAWINGS

These and other objects and advantages are hereinafter set forth and explained with reference to the drawings wherein:

FIG. 1 is a partial sectional view of the end of the pin member to illustrate its change in shape to provide the improved pin member for the joint of the present invention.

FIG. 1A is a partial sectional view of the threads on the pin member shown in FIG. 1. FIG. 1B is a partial sectional view of the swaged portion of the pin member to show the thickness at such position.

FIG. 2 is a partial sectional view of the preferred form of the improved joint of the present invention shown in its made-up position.

FIG. 3 is a similar view of a modified form of the improved joint of the present invention shown in its made-up position.

DESCRIPTION OF THE PREFERRED EMBODIMENTS

Pin member 10 illustrated in FIG. 1 illustrates the steps in the preparation of the improved pin end for the joint of the present invention. The dotted line D on the sectional portion of the pin member wall indicates the original outer surface and inner surface of pin member 10. A typical example of a standard tubular member would be a tubular member having a four and one-half inch nominal outside diameter with a body wall of 0.25 inches and a weight of 11.35 pounds per foot. The dotted line S indicates the shape of the end of pin member 10 after it has been swaged. After swaging, it would have a preferred inside diameter of between 3.945 to 3.925 inches. The thread depth is indicated as being 0.035 inches and the axial dimension between external torque shoulder 12 on pin member 10 and the nearest thread root 14 is approximately 0.25 inches. With this configuration, the critical root thickness "t" at thread root 14 is approximately 0.150 inches which is 63% of the body wall thickness. The depth of shoulder 12 is preferred to be approximately no more than one-third of the depth of the critical root thickness or, in the above example, approximately 0.050 inches.

By comparing the dotted lines (indicating the original, pre-swaged, external and internal diameters of the pin portion of member 10) with the solid lines (indicating the post-swaging internal diameter and the external threads 16) it is apparent that the swaged portion, extending from an end of the pin portion to the external shoulder 12, provides a reduced internal diameter therealong, providing an increased wall thickness for the integral pin-end portion. Such reduced internal diameter portion produced by such swaging extends from the outer end of the pin portion of tubular member 10 to, and terminates substantially at, the external shoulder 12, with no portion of the reduced internal diameter portion having a wall thickness greater than the wall thickness along the length of the elongated body portion of the tubular member 10.

Threads 16 are preferred to be hook threads with 7° hook on the tensile load side of the threads and a shallow depth of 0.035 inches. This hook eliminates the hoop load caused by tension so that the box and pin threads do not push apart to cause thread leakage under tension loading of the joint. With this form of thread, the thread pressure seal is maintained even after the joint parts in tension. This means that the pin dutchman thread, that which is left in the box after it has parted, does not leak if you pack off the bore of the dutchman and apply pressure to the thread. The sealing of the joint of the present invention does not rely upon shoulder or lip seals at the pin end or pin shoulder. Such seals tend to leak when the critical area yield strength is exceeded. The axial yield will, cause the shoulders and lip seals to leak.

The threads of the present invention provide improved sealing because they have close tolerances on thread lead, taper and form. Also, they include a good multiple of effective threads per joint, such as 16 to 40, depending on pipe wall thickness.

Joint 20, as shown in FIG. 2, includes pin or male member 22 made in accordance with the previous description of pin member 10 and box or female member 24. As shown, joint 20 is completely made up and is ready for use. The reduction of the internal diameter of pin member 22 is the result of the swaging and extends over substantially the entire area of external threads 26 on pin member 22. Box member 24 includes internal hook threads 28 starting with thread root 42, which mate with threads 26 on pin member 22. Threads 28 extend substantially from point 38 at end 30 to a position 34 short of internal shoulder 32 leaving an unthreaded area 36. Threads 26 extend from portion 40 adjacent point 38 where the end 44 of female member 24 abuts end 30. While such sealing is possible, the improved joint 20 of the present invention relies on the sealing of the thread engagement which is ensured by the maintenance of close tolerances on thread lead, taper and form. The thread seal is also ensured by having a good multiple of threads per joint as described above.

FIG. 3 illustrates a modified form of the improved joint of the present invention. Joint 50 includes pin member 52 and box member 54. Both pin and box members are substantially the same as members 22 and 24 except that recess 56 is provided in the exterior of pin member 52 between the inner end of its threads 58 and the torque shoulder 60 to provide a uniform wall at the critical thickness and avoid stress concentrations at the thread root of the last thread. Also, a similar recess 62 is provided in the inner end of box member 54 between its last thread 64 and its internal shoulder 66.

What is claimed is:

1. A joint for tubular members comprising:

a first tubular member having an external diameter, an internal diameter, an elongated body portion, an integral pin-end portion with external hook threads and an external shoulder facing said integral pin-end portion and dividing said body portion of said tubular member from said integral pin-end portion of said tubular member;

a second tubular member having an external diameter, an internal diameter, an elongated body portion, an integral box-end portion with internal hook threads adapted to matingly engage said external hook threads on said integral pin-end portion, and an internal shoulder facing said integral box-end portion, and dividing said integral box-end portion from said body of said second tubular member;

said integral pin-end portion of said first tubular member being swaged over a distance from said pin-end portion into said external shoulder to provide a reduced internal diameter therealong providing an increased wall thickness for said integral pin-end portion and said shoulder portion of said first tubular member, said reduced internal diameter extending from an end of said integral pin-end member to, and terminating substantially at, said external shoulder, wherein no portion of said first tubular member in said reduced internal diameter portion has a thickness that is greater than the thickness along the length of said elongated body portion of said first tubular member; and said external diameters of said first and second tubular members forming a substantially flush surface when said first and second tubular members are threadedly engaged to make up said joint.

\* \* \* \* \*